US006426612B1

(12) United States Patent
Rozsypal

(10) Patent No.: US 6,426,612 B1
(45) Date of Patent: Jul. 30, 2002

(54) CIRCUIT AND METHOD FOR SENSING AN OVER-CURRENT CONDITION OF A DUAL MODE VOLTAGE CONVERTER

(75) Inventor: Antonin Rozsypal, Hutisko-Solanec (CZ)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/728,860

(22) Filed: Dec. 4, 2000

(51) Int. Cl.[7] .................................................. G05F 1/40
(52) U.S. Cl. ......................................... 323/282; 323/285
(58) Field of Search ................................. 323/282, 284, 323/285, 272, 273, 283, 281; 363/89, 40, 41

(56) References Cited

U.S. PATENT DOCUMENTS 5,617,015 A * 4/1997 Goder et al. ................ 323/282
5,844,398 A * 12/1998 Stuart ........................... 320/31
6,307,356 B1 * 10/2001 Dwelley ....................... 323/282

* cited by examiner

Primary Examiner—Rajnikant B. Patel

(57) ABSTRACT

A current sense circuit (14) is provided which receives a signal indicative of output current flow of an up/down DC-DC converter during up-conversion and down-conversion modes. The current sense circuit provides a logic signal (CS) indicative of the rate of change of the current flow for both modes of operation. A comparator (42) receives a selectable voltage reference generated by voltage reference (36,38,50). A first voltage reference is selected during an increasing current flow (CS=logic high) and a second voltage reference is selected during a decreasing current flow (CS=logic low), thereby regulating the output current ($I_L$) to a fixed average value. If the length of time during continuous current flow of converter (10) exceeds a predetermined amount of time, a signal (FAULT) is issued and externally processed, which subsequently disables converter (10) by an external signal (ENABLE).

7 Claims, 3 Drawing Sheets

CIRCUIT AND METHOD FOR SENSING AN OVER-CURRENT CONDITION OF A DUAL MODE VOLTAGE CONVERTER

FIELD OF THE INVENTION

The present invention relates, in general, to current sensing devices, and more particularly, to current sensing devices used in continuous current mode, up/down DC-DC converters.

BACKGROUND OF THE INVENTION

DC to DC converters are essential to providing accurate power delivery to sensitive electronic devices. In particular, devices which are designed to operate from a battery. Virtually all mobile devices such as cellular telephones, pagers and laptop computers, for example, require a regulated power supply, which is usually generated from a battery source, such as a NiCad (nickel-cadmium) or Lithium Ion battery source, for example. The amount of time that a battery is able to supply power to a particular device is directly proportional to the charge storage capacity of the battery and the amount of current required by the device. An imperative feature of any DC to DC converter operating from a battery, therefore, is the capability to not only monitor the amount of current delivered to the device by the converter, but the ability of the converter to detect an over-current or short circuit condition. An over-current condition is an anomaly, usually caused by a short circuit condition at the output of the converter, requiring the converter to detect the anomaly and subsequently shut down the converter in order to preserve battery life. High current peaks can damage batteries such as a lithium ion battery, therefore, current peaks must be limited, not only during normal operation, but during start up as well. DC-DC converters operating from battery power supplies must also have the ability to either provide up conversion or down conversion, depending on the voltage of the battery. Up conversion, for example, is needed for a weak battery which is supplying only 2.7 volts, for example, to a DC-DC converter, which is supplying power to a 5 volt load. Down conversion is needed for a fresh battery delivering 6 volts, for example, to the DC-DC converter supplying power to the 5 volt load.

Prior art current detectors for up/down DC-DC converters generally are positioned within the converter circuit, such that only high side current detection is possible. High side current detection occurs only for the up conversion state of the DC-DC converter, whereas, current detection is not performed for the low side, or down conversion, mode. A need exists, therefore, to provide current detection and over-current protection in an up/down DC-DC converter, for both high and low side conversion. Over-current limitation must also be provided during the start up phase of the converter. Additionally, average current detection is preferred over peak current detection, to prevent converter shut down during momentary output current surges.

DETAILED DESCRIPTION OF THE DRAWINGS

Figure 1:
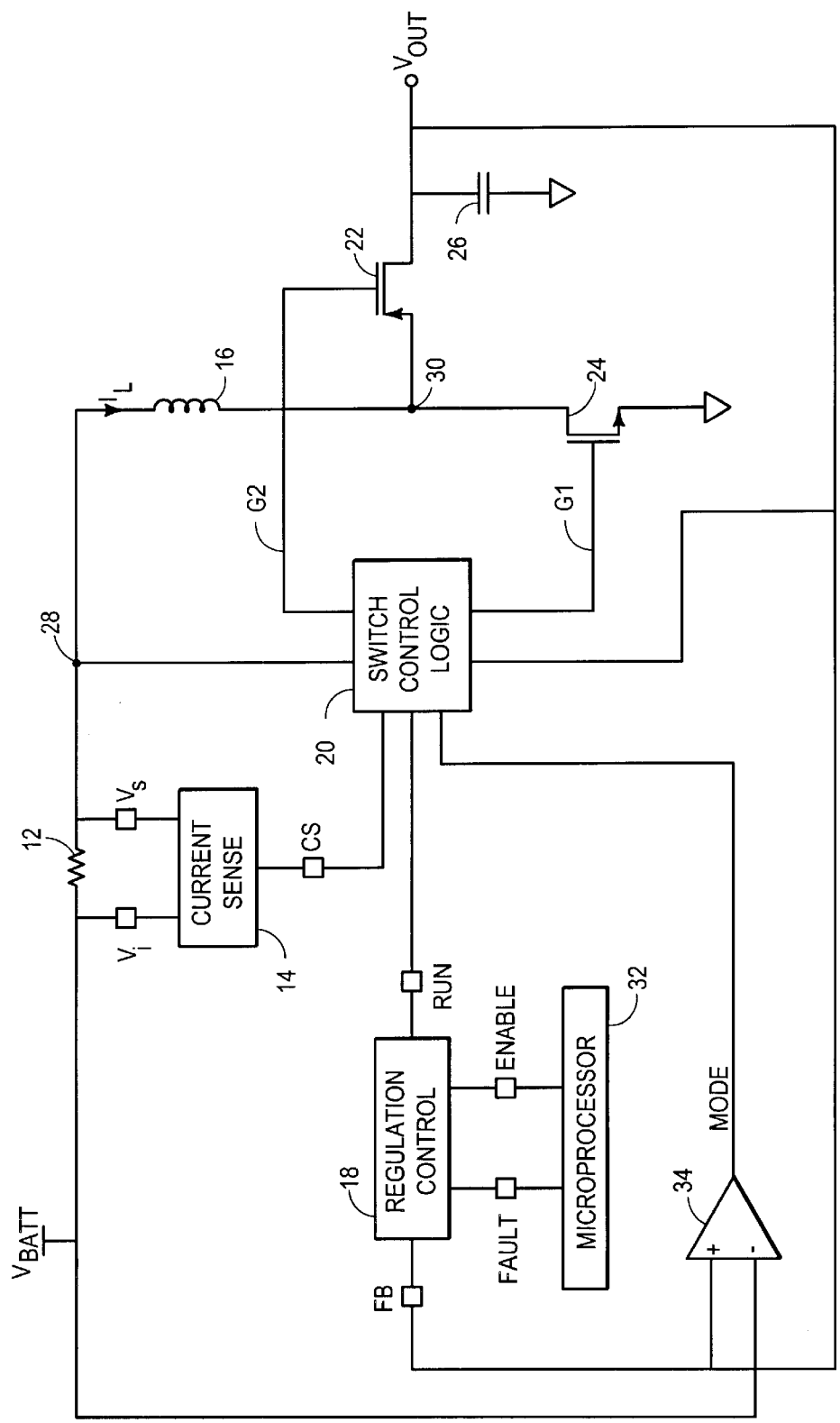
FIG. 1 illustrates a schematic diagram of an up/down, DC-DC converter.

FIG. 1 illustrates an up/down, DC-DC converter utilizing Metal Oxide Semiconductor Field Effect Transistors (MOSFET) 24 and 22, in conjunction with inductor 16 and associated regulation control circuits. In general, converter 10 regulates the output voltage $V_{out}$ to a substantially constant voltage level, while accepting the input voltage $V_{batt}$ from a battery. $V_{out}$ is either regulated to a potential lower than the battery voltage, down conversion, or is regulated to a potential higher than the battery voltage, up conversion.

In operation, converter 10 accepts an input voltage from a battery at node $V_{batt}$. The battery voltage is typically in the range of approximately 2.7 volts to 6 volts. The output voltage, $V_{out}$, is regulated to, for example, 5 volts. Converter 10 is in up-conversion mode for battery voltage, $V_{batt}$, less than 5 volts. Converter 10 is in down-conversion mode for battery voltage, $V_{batt}$, greater than 5 volts. Converter 10 automatically detects the potential relationship between $V_{batt}$ and $V_{out}$, through the operation of comparator 34. Comparator 34 receives the output voltage at the non-inverting input, from terminal $V_{out}$. Comparator 34 receives the battery voltage at the inverting input from terminal $V_{batt}$. Comparator 34 has a built-in input offset voltage equal to approximately 200 millivolts (mV). The offset voltage is required to assure continuous function of converter 10 when $V_{batt}$ and $V_{out}$ are approximately at the same potential. Down-conversion mode requires at least a 200 mV differential between $V_{batt}$ and $V_{out}$ in order to properly function while up-conversion mode can overlap the 200 mV differential range. Comparator 34, in addition, has built in hysteresis, for example 20 mV, which prevents the MODE signal from oscillating between logic high and low voltages when $V_{batt}$ and $V_{out}$ are approximately the same. The conversion mode represented by the MODE signal presented by comparator 34, therefore, is related to input voltages $V_{batt}$ and $V_{out}$ according to Table 1.

TABLE 1

| Input Voltage | Mode |
| --- | --- |
| $V_{out} > = V_{batt} - 200$ mV | UP-Conversion (Logic High) |
| $V_{out} < V_{batt} - 200$ mV | DOWN-Conversion (Logic Low) |

Down conversion mode of converter 10 exists when the battery voltage, $V_{batt}$, is at a higher potential than $V_{out}$. Internal circuitry to switch control logic 20, determines the maximum of the two voltages, $V_{batt}$ or $V_{out}$, and provides the maximum voltage as logic high levels for signals G1 and G2. At startup, $V_{out}$ is at ground potential and $V_{batt}$ is at, for example, 6 volts. Comparator 34 sets the MODE signal to a logic low value, selecting switch control logic 20 to down-conversion mode. NMOS transistor 24 does not enter into a conductive state while converter 10 is in down conversion mode. PMOS transistor 22 is rendered conductive by switch control logic 20, by selecting G2 to be logic low. The voltage present at the source terminal of PMOS transistor 22 exceeds the threshold voltage of PMOS transistor 22 making PMOS transistor 22 conductive. PMOS transistor 22 is said to be in a first mode of conduction when signal G2 is at a logic low value. The first mode of conduction, or first phase of inductor current, is also indicated by signal CS asserted to a logic high value, indicating an inductor current, $I_L$, lower than a predetermined threshold current $I_{max}$, for example, 100 milliamps (mA). Current is conducted by inductor 16, through sense resistor 12 and PMOS transistor 22, to charge capacitor 26. At the beginning of the first phase, the inductor current, $I_L$, is zero. In the first phase, the current in the inductor varies according to the applied voltage $V_L$ across the inductor. The inductor current, $I_L$, starts to increase as $di/dt = V_L/L$, where L is the value of inductance associated with inductor 16 and $di/dt$ is the rate of change of current flow through inductor 16. The applied voltage across inductor 16 is approximately equal to $V_L = V_{BATT} - V_{OUT} - V_{12} - V_{22}$, where $V_{12}$ and $V_{22}$ are voltages developed across sense resistor 12 and PMOS switch 22, respectively. Capacitor 26 is relatively large, for example, 10 uF, so the variation of $V_{out}$ during one cycle of inductor current is negligible. Current sense 14 senses the current flow through resistor 12, which is equivalent to the current flow through inductor 16, and at a predetermined amount of current flow, $I_{max}$, detects a maximum current value. The maximum current value, for example, is predetermined to be 100 mA. Once $I_{max}$ is detected by current sense 14, signal CS is set to a logic low value by current sense 14, indicating that the predetermined maximum inductor current, $I_{max}$, is obtained and a second phase of inductor current begins. Signal G2 is set to a logic high value, approximately equal to $V_{batt}$, since $V_{batt}$ is at a potential greater than $V_{out}$.

A logic high value for signal G2, changes the conduction mode of PMOS transistor 22 to a second mode. PMOS transistor 22 is momentarily rendered non-conductive by the mode change. Inductor 16, however, contains stored magnetic energy, which inverts the voltage polarity across inductor 16 to create a voltage rise from node 28 to node 30. The potential at node 30, the source terminal of PMOS transistor 22, exceeds the threshold voltage of PMOS transistor 22, since the gate terminal of PMOS transistor 22 is set to approximately $V_{batt}$ by signal G2 and the source terminal exceeds $V_{batt}$ by at least the threshold voltage of PMOS device 22. The polarity of the inductor voltage inverts, which changes the sign of the $di/dt$ term for the equation of $V_L$ above, creating a decreasing inductor current. The second mode of operation renders PMOS transistor 22 conductive once again, but the inductor current is now decreasing from the predetermined maximum value of current flow, $I_{max}$, toward a predetermined minimum value of current flow, $I_{min}$. Once the current flow has decreased to $I_{min}$, for example 50 mA, current sense 14 asserts signal CS to a logic high value and switch control logic 20, de-asserts signal G2 (becoming again logic low), rendering PMOS transistor 22 conductive in the first conduction mode. It can be seen, therefore, that PMOS transistor 22 alternates between two modes of conduction states. The first mode of conduction of PMOS transistor 22 creates an increasing inductor current, $I_L$, indicating a first phase of the inductor current waveform and the second mode of conduction of PMOS transistor 22 creates a decreasing inductor current, indicating a second phase of the inductor current waveform. The inductor current waveform increases from $I_{min}$ to $I_{max}$ during a first phase of the current waveform and decreases from $I_{max}$ to $I_{min}$ during a second phase of the current waveform. While converter 10 is supplying drive current to the load connected to terminal $V_{out}$ (not shown), during first or second phases of the inductor current waveform, converter 10 is said to be in a constant current mode of operation. Signal RUN is asserted to a logic high value by regulation control 18 during the constant current mode of operation.

Since converter 10 is in a down-conversion mode, $V_{out}$ is regulated to some potential below $V_{batt}$-200 mV. Converter 10, for example, regulates from voltage $V_{batt}$ approximately equal to 6 volts to voltage $V_{out}$ approximately equal to 5 volts. Once the output voltage $V_{out}$ has reached the predetermined output voltage of 5 volts, for example, converter 10 changes to a skip mode of operation. Skip mode of operation is defined to be a mode of operation whereby no current is conducted by inductor 16 and the inductor current, $I_L$, falls to 0 amps. The energy stored in capacitor 26 supplies power to the load (not shown) connected to node $V_{out}$. The skip mode of operation is set by regulation control 18, via signal RUN, when $V_{out}$ has obtained a predetermined voltage value. Signal RUN is set to a logic high value to enable constant current mode of operation for converter 10 and is set to a logic low value to enable skip mode operation.

As discussed above, $V_{batt}$ is a voltage supply potential derived from a battery. The magnitude of $V_{batt}$ decreases as the amount of charge contained within the battery decreases. As the magnitude of $V_{batt}$ decreases below the voltage required at terminal $V_{out}$, converter 10 automatically changes conversion mode from down-conversion to up-conversion. Comparator 34 asserts signal MODE to a logic high value and switch control logic 20 activates signals G1 and G2 accordingly as needed for up-conversion. Internal circuitry to switch control logic 20 determines $V_{out}$ is the maximum voltage as compared to $V_{batt}$ and asserts signals G1 and G2 with logic high voltage levels equal to $V_{out}$, as opposed to $V_{batt}$, accordingly.

Up-conversion mode engages both NMOS transistor 24 and PMOS transistor 22. At startup, $V_{out}$ is at ground potential and $V_{batt}$ is at, for example, 3 volts. Since $V_{out}$ is at a potential lower than $V_{batt}$, the MODE signal is at a logic low value, which indicates down-conversion mode. The voltage at $V_{out}$ increases as described earlier for down-conversion mode at start up. As the output voltage at node $V_{out}$ increases to a voltage approximately equal to $V_{batt}$-200 mV, the MODE signal reverses from indicating down-conversion mode to indicating up-conversion mode, or a logic high value. Regulation control 18 maintains the RUN signal to a logic high value, since the output voltage has not yet reached the predetermined value of, for example, 5 volts. Once the MODE signal has transitioned to indicate up-conversion mode, switch control logic 20 asserts signal G1 accordingly. As converter 10 transitions from down to up-conversion mode, the voltage at terminal $V_{out}$ approximates $V_{batt}$-200 mV. Signals G1 and G2 are asserted to a logic high, or $V_{out}$, rendering NMOS transistor 24 conductive and PMOS transistor 22 non-conductive. Inductor 16 continues to store magnetic energy as the inductor current waveform continues to increase from $I_{min}$ to $I_{max}$, which are predetermined values set by current sense 14 as described earlier. NMOS transistor 24 conducts the inductor current until the inductor current reaches $I_{max}$. Once the inductor current reaches $I_{max}$, NMOS transistor 24 is rendered non-conductive by switch control logic 20 by de-asserting signal G1 to a logic low value and PMOS transistor 22 is rendered conductive by de-asserting signal G2 to a logic low value. The voltage developed across inductor 16 inverts, maintaining a source voltage at PMOS transistor 22 which exceeds the threshold voltage of PMOS transistor 22. Since PMOS transistor 22 is conductive, inductor 16 continues to supply drive current to charge capacitor 26, with decreasing drive current towards $I_{min}$, consistent with phase two of the current waveform discussed above. Once the current waveform has reached $I_{min}$, phase one of the current waveform repeats to continue the continuous current mode of operation. The voltage across capacitor 26, $V_{out}$, continues to increase toward the predetermined value set by regulation control 18, for example, 5 volts. Once the output voltage has reached 5 volts, regulation control 18 de-asserts signal RUN, programming converter 10 to a skip mode of operation, whereby no current is conducted by either NMOS transistor 24 or PMOS transistor 22. The energy stored in capacitor 26 delivers the required power to the load connected to node $V_{out}$ (not shown). Once the voltage at node $V_{out}$ has transitioned below a predetermined value set by regulation control 18, signal RUN is asserted by regulation control 18 and continuous current mode resumes.

Over-current protection is provided by converter 10, in conjunction with microprocessor 32. Inductor current, $I_L$, as discussed above, oscillates between phase one (increasing current) and phase two (decreasing current). Converter 10 is said to be operating in a continuous current mode of operation while the inductor current oscillates between first and second phases. Converter 10 is designed to prohibit a continuous current mode of operation, if the continuous current mode of operation persists longer than a predetermined amount of time. Regulation control 18 asserts signal RUN, when converter 10 is operating in the continuous current mode. A timer, located within regulation control 18, is enabled by a low to high transition of the signal RUN. The timer has a predetermined timeout value which is programmed to, for example, 4 milliseconds (mS). If the RUN signal is not de-asserted by regulation control 18 within the 4 mS time period, the timer expires and signal FAULT transitions from a low to a high logic value. Microprocessor 32 responds to the FAULT signal by de-asserting signal ENABLE. Once signal ENABLE has transitioned to a logic low value, signal RUN is de-asserted and converter 10 immediately transitions to stop mode. Signal FAULT is de-asserted to a logic low value and microprocessor 32 performs supervisory functions to report the fault condition. Restart by setting ENABLE logic high is possible, but if the overload condition, for example an output short persists after 4 ms, the FAULT flag is asserted once again.

Figure 2:
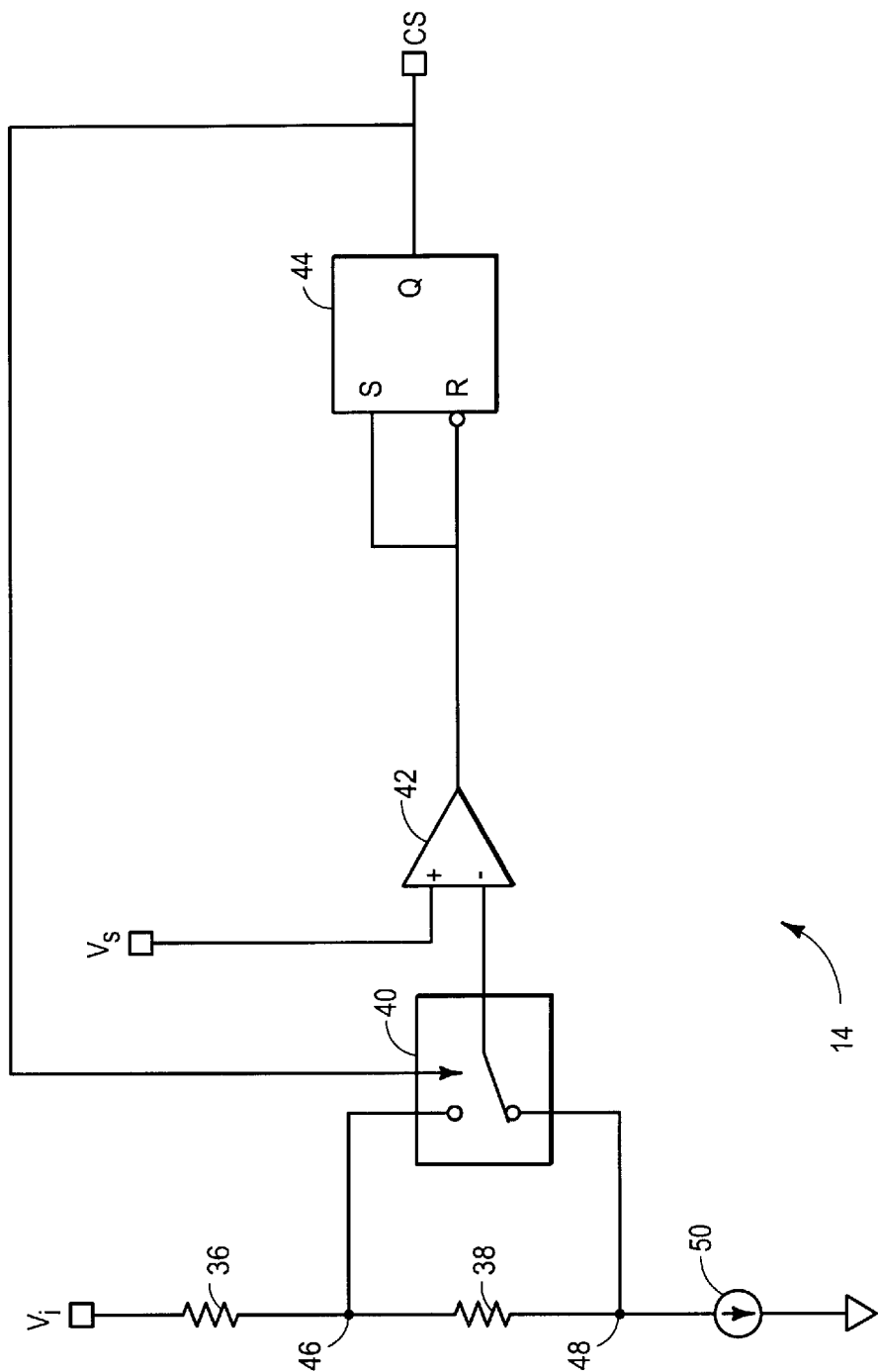
FIG. 2 illustrates the current sense circuit of FIG. 1.

FIG. 2 illustrates a detailed schematic of current sense 14. Current sense circuit 14 comprises a voltage reference implemented by resistors 36 and 38 coupled together in series at node 46. A first terminal of resistor 36 is coupled to the $V_i$ terminal. A second terminal of resistor 36 is coupled to a first terminal of resistor 38 at node 46. A second terminal of resistor 38 is coupled to a first terminal of current source 50 at node 48. A second terminal of current source 50 is coupled to, for example, ground potential. A first input terminal of switch 40 is coupled to node 46 and a second input terminal of switch 40 is coupled to node 48. A control terminal of switch 40 is coupled to the Q output of flip-flop 44. The output of switch 40 is coupled to the inverting input of comparator 42. The non-inverting input of comparator 42 is coupled to terminal $V_s$. The output of comparator 42 is coupled to both the S and R inputs of flip-flop 44.

In operation, current sense circuit 14 compares the sense voltage at node $V_s$ to one of two reference voltages at nodes 46 and 48. The reference voltage developed at node 46 is equal to $V_{REF46}=V_i-I_{50}*R_{36}$, where $V_i$ is equal to $V_{batt}$, $I_{50}$ is the current conducted by current source 50 and $R_{36}$ is the resistance value of resistor 36. The reference voltage at node 48 is $V_{REF48}=V_i-I_{50}*(R_{36}+R_{38})$, where $R_{38}$ is the resistance value of resistor 38. At start up, $V_s$ is equal to $V_{batt}$, since inductor current, $I_L$, is zero. The voltage at the non-inverting input to comparator 42 is more positive than the inverting input to comparator 42, which causes the output of comparator 42 to transition to a logic high level. A logic high level at the S input to flip-flop 46 sets the Q output of flip-flop 46 to a logic high level at terminal CS. Switch 40 position as shown in FIG. 2 selects $V_{REF48}$, which indicates that the inductor current is increasing and that the current waveform is in the first phase. As the inductor current increases, $V_s$ decreases, since the voltage drop across resistor 12 increases. Once $V_s$ falls below $V_{REF48}$, the non-inverting input to comparator 42 is more negative than the inverting input to comparator 42, which causes the output of comparator 42 to transition to a logic low level, signaling phase 2 of the inductor current waveform. A logic low level activates the reset input of flip flop 44 and causes the Q output of flip flop 44 to transition to a logic low level at terminal CS. A logic low level at terminal CS causes switch 40 to select reference voltage $V_{REF46}$, causing the inverting input to comparator 42 to be more positive than the non-inverting input, which maintains the logic low level at the output of comparator 42. Once the inductor current waveform transitions to phase 2, the voltage at terminal $V_s$ has reached a minimum value and begins to increase, due to the voltage inversion across inductor 16 as discussed above. Once the voltage at terminal $V_s$ increases above $V_{REF46}$, the output of comparator 42 transitions to a logic high level, which sets the Q output of flip flop 44 at terminal CS to a logic high level. Switch 40 then selects $V_{REF48}$, and phase 1 of the inductor current waveform repeats. It can be seen, therefore, that the appropriate selection of resistance values of R36 and R38 accurately sets the minimum inductor current, $I_{min}$, and maximum inductor current, $I_{max}$, values for continuous current mode of operation.

It should be noted that converter 10 provides a first mode of over-current protection utilizing current sense 14 in combination with switch control logic 20. As discussed above, current sense 14 provides a logic signal CS which indicates first and second phases of the inductor current waveform. A logic high value for CS indicates an increasing inductor current, $I_L$, and a logic low value for CS indicates a decreasing inductor current. Switch control logic 20 controls current switches 22 and 24 according to the value of signal CS, causing the inductor current to reverse phases when logic signal CS reverses logic levels, regardless of the state of the load connected to $V_{out}$ (not shown). In other words, the inductor current enters phase two, or decreases in magnitude, when the inductor current has reached a value equal to $I_{max}$, regardless of the logic level of signal RUN. Signal RUN, as discussed earlier, is asserted as long as voltage $V_{out}$ has not obtained a predetermined magnitude set in regulation control 18. Current sense signal CS, therefore, overrides signal RUN to invoke over-current protection of converter 10 in all phases of operation of converter 10. By regulating the magnitude of the inductor current, $I_L$, between minimum and maximum values, the inductor current is maintained at a fixed average value during the continuous mode of operation of converter 10.

Figure 3:
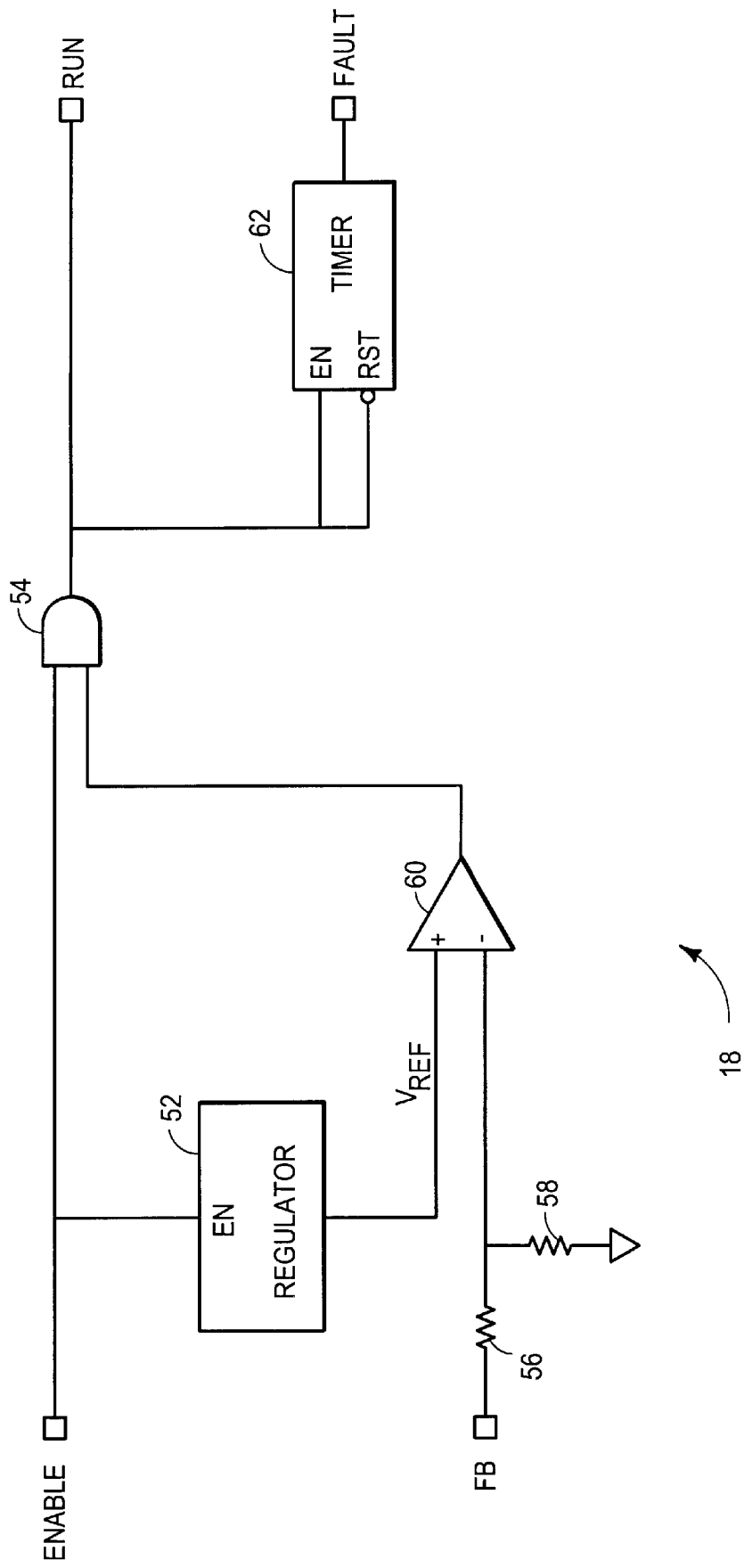
FIG. 3 illustrates the over-current protection of the regulation control circuit of FIG. 1.

FIG. 3 illustrates a detailed schematic diagram of regulation control 18, which contains over-current protection circuitry. One input of AND gate 54 is coupled to the ENABLE terminal and the EN input of regulator 52. A first terminal of resistor 56 is coupled to terminal FB and a second terminal of resistor 56 is coupled to a first terminal of resistor 58 and the inverting input of comparator 60. The non-inverting input to comparator 60 is coupled to the reference voltage output of regulator 52, $V_{REF}$. The output of comparator 60 is coupled to a second input of AND gate 54. The output of AND gate 54 is coupled to the RUN terminal, the EN input of timer 62 and the RST input of timer 62. The output of timer 62 is coupled to terminal FAULT.

FIG. 3 provides a second mode of over-current protection for converter 10. In operation, the signal present at the ENABLE terminal is asserted by microprocessor 10 to a logic high value. The voltage at terminal $V_{out}$ is coupled to terminal FB and divided by resistor network 56 and 58. Reference voltage $V_{ref}$ is set by regulator 52 such that the output of comparator 60 is at a logic high value when the inverting input to comparator 60 is at a voltage less than $V_{ref}$.

The output of comparator 60 is at a logic low value when the inverting input of comparator 60 is at a voltage greater than $V_{ref}$. $V_{ref}$ is set such that the output voltage, $V_{out}$, is regulated to, for example, 5 volts. Signal RUN is asserted by regulation control 18 when both the ENABLE signal and the output of comparator 60 are at logic high levels. In other words, converter 10 is in RUN mode, when microprocessor 32 has enabled converter 10 and the regulated voltage at terminal $V_{out}$ is lower than the predetermined output voltage set by $V_{ref}$, for example, 5 volts. Conversely, converter 10 is not in RUN mode for one of two reasons:

1.) Normal regulation has sufficiently charged capacitor 26 to the required regulated voltage causing the output of comparator 60 to transition to a logic low value, which causes the RUN signal to be de-asserted and causes converter 10 to transition to skip mode; or 2.) Timer 62 has expired and has asserted signal FAULT which is read by microprocessor 32. Microprocessor 32, subsequently de-asserts the ENABLE signal, thereby programming converter 10 to stop mode. Microprocessor 32 has the ability to program the converter to stop mode for a multitude of conditions, depending upon the application.

Timer 62 receives signal RUN at the EN and RST terminals. A low to high transition at terminal EN, enables a countdown sequence of timer 62 to commence. A predetermined timer value is set to, for example, 4 mS. If converter 10 has not achieved an acceptable potential at terminal $V_{out}$ through continuous current regulation as discussed above within 4 mS, timer 62 expires, asserting signal FAULT. Microprocessor 32 reacts to signal FAULT by de-asserting signal ENABLE, thereby programming converter 10 to stop mode. Stop mode, as discussed above, prohibits current conduction through either transistors 22 or 24. The inductor current, $I_L$, then reduces to zero in response to the stop mode of operation. Re-assertion of signal ENABLE by microprocessor 32 causes converter 10 to transition to start up mode as discussed above. An over-current condition is therefore predetermined to be any condition which causes continuous current regulation for longer than the predetermined timer value, for example, 4 mS.

By now it should be appreciated that a current sense circuit and over-current protection for an up/down DC-DC converter has been provided. An advantage of the current sense circuit provides a method to accurately set a minimum and a maximum value of inductor current during a continuous current mode of regulation. An advantage of the over-current protection is to preserve the life span of batteries such as lithium ion batteries, which exhibit shortened life spans due to current surges. An additional advantage of the over-current protection is the external detection of the over-current condition which allows a device, such as a microprocessor, to report the condition.

What is claimed is:

1. In a power supply, a regulator circuit operating in a continuous mode of operation to provide an output signal with an inductor current operating between minimum and maximum values in response to a sense signal, the regulator circuit comprising:

a sense circuit coupled for continuously sensing the inductor current to provide the sense signal; and a control circuit coupled to receive the sense signal and a feedback signal and including a timer having an output coupled to provide a fault signal indicative of the duration of the inductor current and magnitude of the output signal.

2. The regulator circuit of claim 1 wherein the sense circuit comprises:

a sense element for routing the inductor current to develop a representative sense voltage; and a comparator for comparing the sense voltage to a reference signal to produce the sense signal.

3. The regulator circuit of claim 2, further comprising a memory storage device for storing the value of the sense signal.

4. A method of providing over-current protection in a continuous mode regulator, comprising:

initiating an inductor current with an enabling signal;

switching the inductor current to develop an output voltage; and stopping the inductor current if the output voltage fails to reach a predetermined value after a predetermined period of time.

5. The method of claim 4 wherein initiating an inductor current comprises:

routing the inductor current through a sense element to generate a sense voltage; and comparing the sense voltage with a predetermined reference signal to produce a sense signal indicative of the inductor current.

6. The method of claim 4 wherein the step of initiating comprises activating a timer after initiating the inductor current.

7. The method of claim 4 wherein the step of stopping comprises:

counting to the predetermined period of time to generate a fault signal; and disabling a switch in response to the fault signal.

* * * * *